United States Patent
Shinagawa et al.

(10) Patent No.: US 9,181,988 B2
(45) Date of Patent: Nov. 10, 2015

(54) POWER TRANSMISSION SWITCHING DEVICE AND RECORDING APPARATUS

(75) Inventors: Yu Shinagawa, Shiojiri (JP); Sanshiro Takeshita, Shiojiri (JP); Kosuke Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1821 days.

(21) Appl. No.: 12/464,944

(22) Filed: May 13, 2009

(65) Prior Publication Data

US 2009/0284565 A1    Nov. 19, 2009

(30) Foreign Application Priority Data

May 14, 2008   (JP) .................................. 2008-126889

(51) Int. Cl.
| | |
|---|---|
| *B41J 2/01* | (2006.01) |
| *F16D 11/14* | (2006.01) |
| *B41J 11/42* | (2006.01) |
| *B41J 23/02* | (2006.01) |
| *B41J 11/00* | (2006.01) |
| *B25J 9/04* | (2006.01) |

(52) U.S. Cl.
CPC ................. *F16D 11/14* (2013.01); *B41J 11/42* (2013.01); *B41J 23/025* (2013.01); *B25J 9/042* (2013.01); *B41J 11/007* (2013.01); *Y10T 74/19079* (2015.01)

(58) Field of Classification Search
CPC .......... B41J 11/42; B41J 11/007; B25J 9/042
USPC .............................. 347/16, 32, 104; 74/665 L
See application file for complete search history.

(56) References Cited

U.S. PATENT DOCUMENTS

| | | | |
|---|---|---|---|
| 2004/0057071 A1* | 3/2004 | Lin et al. ...................... | 358/1.15 |
| 2007/0057447 A1* | 3/2007 | Asada et al. .................. | 271/272 |
| 2009/0035018 A1* | 2/2009 | Koga et al. .................... | 399/167 |
| 2010/0139430 A1* | 6/2010 | Chu et al. ........................ | 74/347 |
| 2014/0318922 A1* | 10/2014 | Shinagawa et al. ......... | 192/30 R |

FOREIGN PATENT DOCUMENTS

| | | |
|---|---|---|
| JP | 11-227179 | 8/1999 |
| JP | 2001-162887 | 6/2001 |

* cited by examiner

*Primary Examiner* — Henok Legesse
(74) *Attorney, Agent, or Firm* — Workman Nydegger

(57) ABSTRACT

A power transmission switching device includes a power shaft that is rotationally driven, a power transmission unit that is displaced between first and second positions positioned in an axial direction of the power shaft, a first positioning member that positions the power transmission unit in the first position, and a second positioning member that positions the power transmission unit in the second position. Any one or both of the switching of the connection and non-connection between the power shaft and the power transmission unit and the switching of the connection and non-connection between the power transmission unit and a driven part using the power shaft as a power source are performed by the switching of the position of the power transmission unit. The power transmission unit has at least one middle position between the first and second positions, and is held in the middle position by a holding unit.

3 Claims, 14 Drawing Sheets

POWER TRANSMISSION SWITCHING DEVICE AND RECORDING APPARATUS

BACKGROUND

1. Technical Field

The present invention relates to a power transmission switching device that switches the transmission and non-transmission of rotational torque from a power shaft rotationally driven by a motor or the like to a driven part using the power shaft as a driving source. Further, the present invention relates to a recording apparatus that is provided with the power transmission switching device.

2. Related Art

An ink jet printer, which is an example of a recording apparatus, will be exemplified below. The ink jet printer includes a plurality of objects to be driven, such as a feeding device that feeds a paper sheet, a roller that transports the paper sheet, a carriage on which a recording head is mounted, and a pump device that sucks ink from the recording head. However, if a dedicated drive motor is provided to each of the objects to be driven, cost is significantly increased. Accordingly, a switching mechanism, which selectively switches the object driven by the motor, is provided in order to drive the plurality of objects by one motor.

The switching mechanism switches the object to be driven by the switching of a gear train, and a carriage disclosed in JP-A-11-227179 or JP-A-2001-162887 is used for the switching of the gear train.

According to the switching mechanism in the related art, if a carriage is moved to the switching mechanism (home area), the switching mechanism is unlocked, so that the switching of the object to be driven can be performed. If the carriage is moved to the switching mechanism returns to a printing area from the switching mechanism (home area) the switching mechanism is locked. Accordingly, a state where power is transmitted to a specific object to be driven is fixed.

Meanwhile, if a rotating shaft of a transport roller transporting a paper sheet is used as a power shaft and power is transmitted to a switching mechanism from the power shaft, power is not transmitted to the objects to be driven (for example, a feeding device and the like) and only the power shaft (transport roller) may be intended to be rotated like, for example, when a paper jam is treated.

However, according to the switching mechanism in the related art, the carriage needs to be always held at the switching mechanism (home area) not to transmit power to the object to be driven. Accordingly, degree of freedom deteriorates in the operation of a carriage.

SUMMARY

An advantage of some aspects of the invention is to provide a switching mechanism that can be maintained in a specific state without deterioration of the degree of freedom in the operation of a carriage, and particularly, can be maintained in several states independently of a carriage.

According to a first aspect of the invention, a power transmission switching device includes a power shaft that is rotationally driven, a power transmission unit that is displaced between first and second positions positioned in an axial direction of the power shaft, a first positioning member that positions the power transmission unit in the first position, and a second positioning member that positions the power transmission unit in the second position. Any one or both of the switching of the connection and non-connection between the power shaft and the power transmission unit and the switching of the connection and non-connection between the power transmission unit and a driven part using the power shaft as a power source are performed by the switching of the position of the power transmission unit. The power transmission unit has at least one middle position between the first and second positions, in the middle position the power transmission unit is held by a holding unit, independently of the first and second positioning members.

According to this aspect, the power transmission unit, which transmits rotational torque to the driven part from the power shaft, has the first position where the power transmission unit is positioned by the first positioning member, the second position where the power transmission unit is positioned by the second positioning member, and additionally, at least one middle position where the power transmission unit can be held independently of the first and second positioning members. Accordingly, when the first or second positioning member is also used as another component, it may be possible to secure the degree of freedom in the operation of the component by using the middle position.

According to a second aspect of the invention, a power transmission switching device includes a power shaft, a power transmission unit, a first positioning member, and a second positioning member. The power shaft is rotationally driven. The power transmission unit is provided so as to be displaced between first and second positions positioned in an axial direction of the power shaft, and transmits rotational torque of the power shaft to a driven part using the power shaft as a power source. The first positioning member displaces the power transmission unit from the second position toward the first position by pushing the power transmission unit toward the first position, and positions the power transmission unit in the first position. The second positioning member is displaced in the axial direction of the power shaft, is engaged with the power transmission unit, displaces the power transmission unit from the first position toward the second position against a pushing force of the first positioning member, and positions the power transmission unit in the second position by holding the position of the power transmission unit in the axial direction. Any one or both of the switching of the connection and non-connection between the power shaft and the power transmission unit and the switching of the connection and non-connection between the power transmission unit and the driven part are performed by the switching of the position of the power transmission unit. The power transmission unit has at least one middle position between the first and second positions, in the middle position the power transmission unit is held against a pushing force of the first positioning member by a holding unit, independently of the second positioning member.

According to this aspect, the power transmission unit, which transmits rotational torque to the driven part from the power shaft, has the first position where the power transmission unit is positioned by the first positioning member, the second position where the power transmission unit is positioned by the second positioning member, and at least one middle position where the power transmission unit can be held against a pushing force of the first positioning member independently of the second positioning member. That is, the power transmission unit has the first position and the middle position as positions that are held even though the second positioning member is separated from the power transmission unit.

Accordingly, it may be possible to secure the degree of freedom in the operation of the second positioning member by using the middle position. Further, it may be possible to quickly switch the position of the power transmission unit to the middle position without performing additional operations by only one action that displaces the power transmission unit by the second positioning member.

According to a third aspect of the invention, in the power transmission switching device according to the first or second aspect, the middle position of the power transmission unit may be a non-connection position where the power transmission unit is not connected to the power shaft.

According to this aspect, the middle position of the power transmission unit is a non-connection position where the power transmission unit is not connected to the power shaft. Accordingly, it may be possible to freely rotate the power shaft when the power transmission unit is in the middle position.

According to a fourth aspect of the invention, the power transmission switching device according to any one of the first to third aspects may further include a plurality of the driven parts that includes input gears disposed on the circumference of a circle having an axis of the power shaft as a center, respectively. The power transmission unit may include an arm member, a transmission gear, and a clutch unit. The arm member includes a shaft hole into which the power shaft is inserted, is slidably displaced through the shaft hole in the axial direction of the power shaft, and is swung about the power shaft. The swing of the arm member is restrained by a restraining unit when the power transmission unit is in the first position, and the restraint caused by the restraining unit is released when the power transmission unit is in the second position. The transmission gear is provided to the arm member, is engaged with one input gear of the plurality of input gears and transmits rotational torque of the power shaft to the input gear when the power transmission unit is in the first position, is positioned at a completely different position where the transmission gear is not engaged with the input gears when the power transmission unit is in the second position, and is positioned at a position where the transmission gear is connected to one input gear of the plurality of input gears through the swing of the arm member. The clutch unit is disengaged from the arm member when the power transmission unit is in the first position, is engaged with the arm member and transmits the rotational torque of the power shaft to the arm member when the power transmission unit is in the second position, and swings the arm member.

According to this aspect, a plurality of driven parts is provided, and one of the plurality of driven parts is selected through the swing of the arm member. Accordingly, it may be possible to dispose the plurality of driven parts (input gears) on the circumference of a circle, which has the center of the swing of the arm member as a center. That is, it may be possible to transmit rotational torque to the plurality of driven parts by one driving shaft.

According to a fifth aspect of the invention, in the power transmission switching device according to the fourth aspect, the clutch unit may includes power shaft side comb-toothed parts that are provided at the power shaft and are rotated together with the power shaft as a single body; and arm side comb-toothed parts that are provided at the arm member, are separated from the power shaft side comb-toothed parts when the power transmission unit is in the first position, and are engaged with the power shaft side comb-toothed parts when the power transmission unit is in the second position. Further, in the power transmission unit, the engaged part to be engaged with the second positioning member may be formed at a member separate from the arm member, and an elastic member may be provided between the engaged part and the arm member. When the engaged part receives a force from the second positioning member and is displaced from the first position toward the second position, the arm member may be displaced by an elastic force of the elastic member. When the power transmission unit is in the second position, the arm side comb-toothed parts may be pressed against the power shaft side comb-toothed parts by the elastic force of the elastic member.

The clutch unit, which transmits the rotational torque of the power shaft to the arm member, includes power shaft side comb-toothed parts that are rotated together with the power shaft as a single body, and arm side comb-toothed parts that are formed at the arm member. When the second positioning member displaces the arm member toward the second position, the both comb-toothed parts are engaged with each other. However, when the second positioning member displaces the arm member toward the second position, there is a concern that the arm side comb-toothed parts are not engaged with the power shaft side comb-toothed parts and breakage occurs due to the collision between the ends of the teeth of the both comb-toothed parts.

According to this aspect, in the power transmission unit, the engaged part to be engaged with the second positioning member is formed at a member separate from the arm member, and the arm member is displaced by the elastic force of the elastic member that is provided between the engaged part and the arm member. Accordingly, even though the arm side comb-toothed parts are not engaged with the power shaft side comb-toothed parts and the ends of the teeth of the both comb-toothed parts collide with each other, only the arm member can be stopped in that position and the breakage of the teeth may be prevented. In addition, since the arm side comb-toothed parts are pushed so as to be engaged with the power shaft side comb-toothed parts by the elastic force of the elastic member, the both comb-toothed parts may be correctly engaged with each other if the power shaft is rotated by a predetermined angle.

According to a sixth aspect of the invention, in the power transmission switching device according to the fifth aspect, each of faces of teeth of the power shaft side comb-toothed parts and the arm side comb-toothed parts, which come in contact with each other, may form a predetermined angle with respect to the axial direction of the power shaft. The elastic force of the elastic member may be larger than a component, which is parallel to the axial direction, of pressure, which is generated on the faces of the teeth when the power shaft side comb-toothed parts transmit rotational torque to the arm side comb-toothed parts, so that the arm side comb-toothed parts and the power shaft side comb-toothed parts are pressed against each other and maintained.

If each of faces of teeth of the power shaft side comb-toothed parts and the arm side comb-toothed parts, which come in contact with each other, forms a predetermined angle with respect to the axial direction of the power shaft, the arm side comb-toothed parts tend to be separated from the power shaft side comb-toothed parts due to a component, which is parallel to the axial direction, of pressure that is generated on the faces of the teeth when the power shaft side comb-toothed parts transmit rotational torque to the arm side comb-toothed parts. In this case, the faces of the teeth slide each other, and the arm side comb-toothed parts, that is, the arm member is unnecessarily swung. For this reason, there is a concern that the positioning accuracy of the transmission gear deteriorates. However, according to this aspect, the elastic force of the elastic member is larger than the component parallel to the axial direction. Accordingly, when the power shaft side comb-toothed parts transmit rotational torque to the arm side comb-toothed parts, it may be possible to prevent the arm member from being unnecessarily swung.

According to a seventh aspect of the invention, in the power transmission switching device according to the fifth or sixth aspect, the shaft hole of the arm member into which the power shaft is inserted may be formed by a sleeve that forms a cylindrical shape, the engaged part may be formed at a case member that includes the arm side comb-toothed parts and the power shaft side comb-toothed parts therein, the case member may include openings at both ends thereof in the axial direction of the power shaft, one opening of the case member may be formed so that a predetermined gap is formed between an outer peripheral surface of the sleeve and itself, and the other opening may be formed so as to come in sliding contact with the outer peripheral surface of the power shaft. The power shaft side comb-toothed parts may be formed at a cylindrical member that includes a flange coming in sliding contact with an inner peripheral surface of the case member. The moment, which is generated at the case member when the second positioning member presses the engaged part, may be taken by a contact portion between the power shaft and the opening of the case member, and a contact portion between the inner peripheral surface of the case member and the flange of the cylindrical member.

As described in the fourth aspect, the engaged part to be engaged with the second positioning member in the power transmission unit is formed at a member separate from the arm member and the arm member is displaced by the elastic force of the elastic member that is provided between the engaged part and the arm member. Accordingly, even though the arm side comb-toothed parts are not engaged with the power shaft side comb-toothed parts and the teeth of the both comb-toothed parts collide with each other, the arm member can be stopped at the position where the ends of the teeth collide with each other and the breakage of the teeth may be prevented.

In this case, the engaged part is pushed by the second positioning member and is continuously displaced in the axial direction of the power shaft. However, if the engaged part is pushed by the second positioning member, moment may be generated at the case member. Accordingly, when the cam member comes in contact with the arm member (sleeve), the case member displaces the arm member. For this reason, there is a concern that the ends of the teeth of the arm side comb-toothed parts and the power shaft side comb-toothed parts come in strong contact with each other and are broken. However, according to this aspect, the moment is taken by other contact portions so that case member and the arm member do not come in contact with each other. Therefore, it may be possible to prevent the above-mentioned problem.

According to an eighth aspect of the invention, in the power transmission switching device according to any one of the fourth to seventh aspects, while the power transmission unit returns to the first position before being displaced from the first position toward the middle position and then displaced to the second position, the restraining unit may restrain the swing of the arm member.

According to this aspect, the restraining unit, which restrains the swing of the arm member when the power transmission unit is in the first position where power is transmitted to the driven part, restrains the swing of the arm member while the position of the power transmission unit is switched to the first position, the middle position, and the first position in this order. Accordingly, the transmission gear is maintained while selecting any one of the plurality of input gears. As a result, when the power transmission unit returns to the first position, the selected driven part may be promptly driven without selecting one of the input gears.

According to a ninth aspect of the invention, in the power transmission switching device according to any one of the fourth to eighth aspects, the arm member may be in any one state of a state where the swing of the arm member is restrained by at least the restraining unit and a state where rotational torque of the power shaft is transmitted by the clutch unit, in the entire displacement area when being slidably displaced in the axial direction of the power shaft.

According to this aspect, since the arm member is not free in the entire displacement area between the first and second positions, it may be possible to correctly control the attitude of the arm member without the unintended swing of the arm member.

According to a tenth aspect of the invention, in the power transmission switching device according to any one of the first to ninth aspects, the holding unit, which holds the power transmission unit in the middle position, may include a restrained portion and a cam member. The restrained portion is provided at the power transmission unit. The cam member includes a guide passage that guides the restrained portion during the displacement of the power transmission unit, and a stopper that regulates the displacement of the restrained portion toward the first position and is formed on the guide passage.

According to this aspect, the holding unit, which holds the power transmission unit in the middle position, includes a restrained portion that is provided at the power transmission unit, and a cam member that is engaged with the restrained portion. Accordingly, the structure of the holding unit, which holds the power transmission unit in the middle position, is simplified, so that it may be possible to make the holding unit at low cost.

According to an eleventh aspect of the invention, a recording apparatus includes a recording head that performs recording on a medium to be recorded, a carriage that is provided with the recording head and is moved in a scanning direction of the recording head, and a power transmission switching device according to any one of the first to ninth aspects. The carriage may form the second positioning member.

According to this aspect, it may be possible to obtain the same advantages as any one of the first to ninth aspects from the recording apparatus. Further, the carriage, which is an existing component of the recording apparatus, forms the second positioning member that switches the position of the power transmission unit from the first position to the second position against the pushing force of the first positioning member pushing the power transmission unit toward the first position. Accordingly, since an existing component is used, it may be possible to prevent the increase of manufacturing cost of the apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
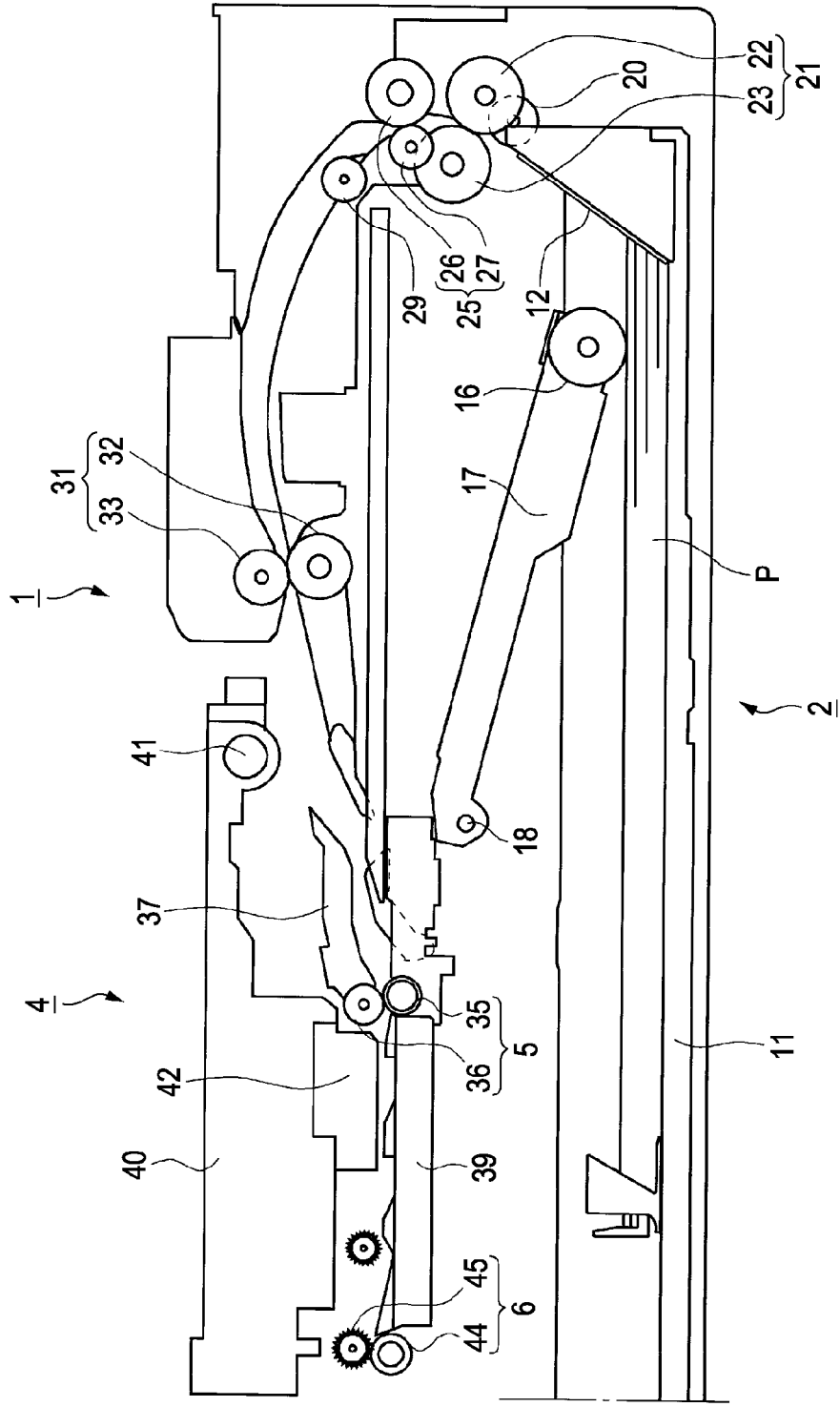
FIG. 1 is a side cross-sectional view showing a paper sheet transport path of a printer according to an embodiment of the invention.
Figure 2:
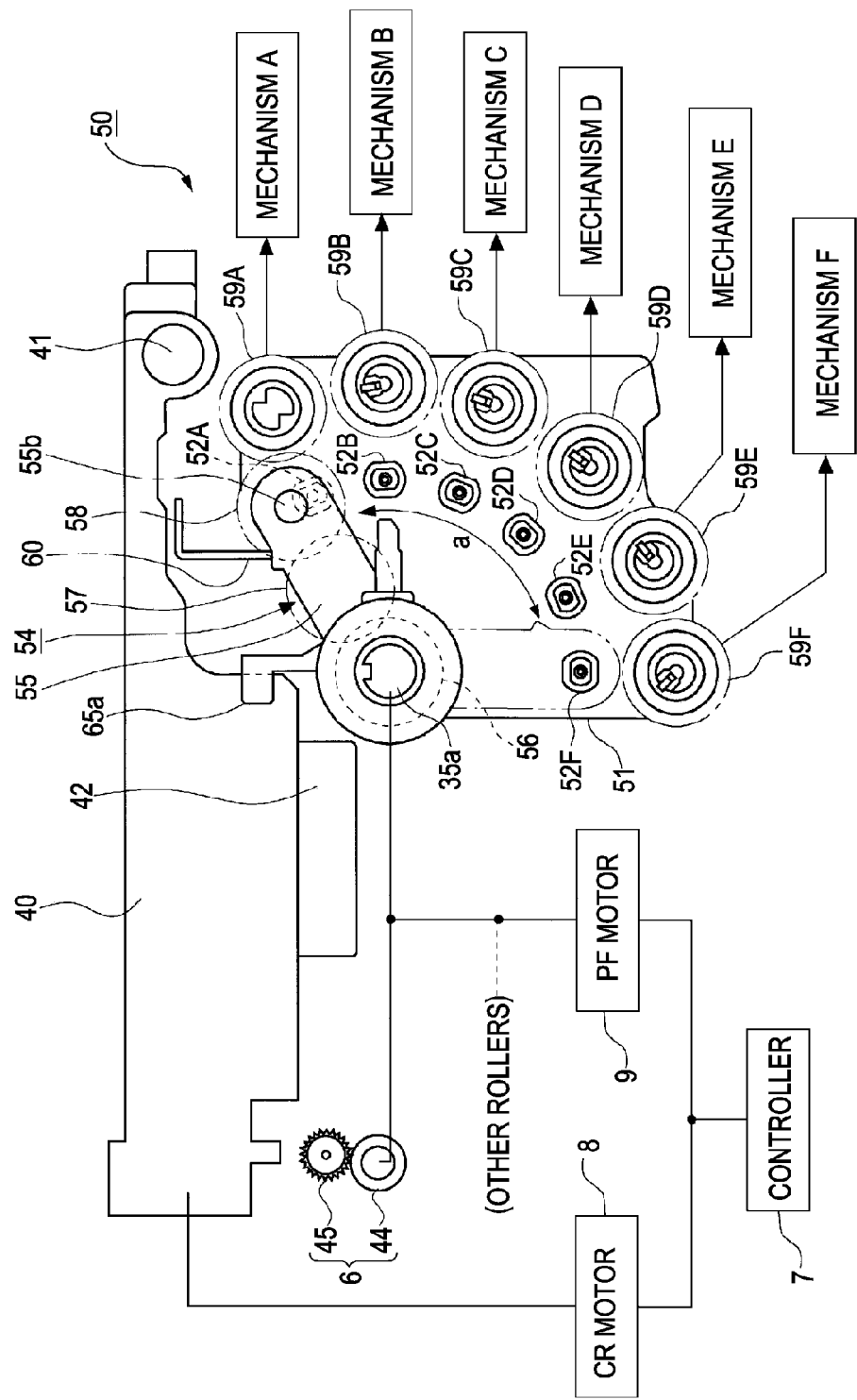
FIG. 2 shows a front view of a power transmission switching device according to an embodiment of the invention and a block diagram of a control system.
Figure 3:
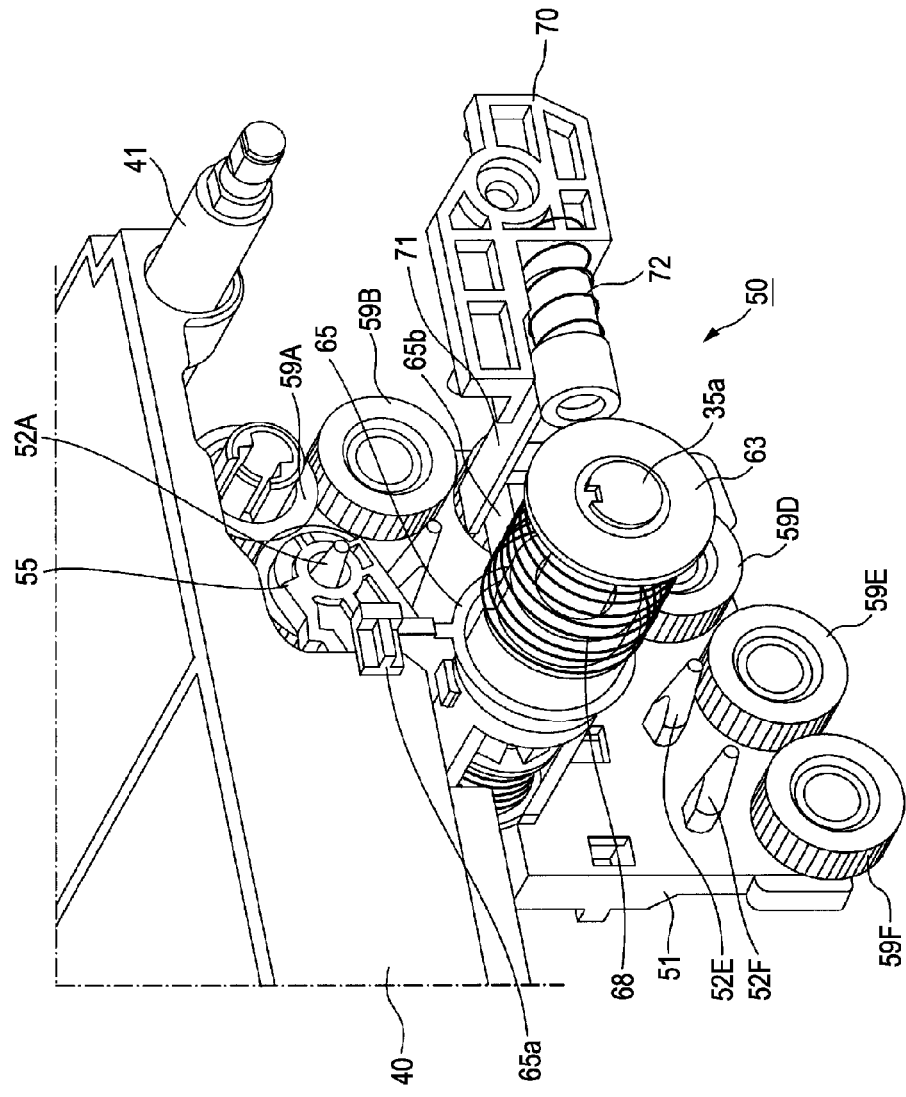
FIG. 3 is a perspective view of the entire power transmission switching device according to the embodiment of the invention.
Figure 4:
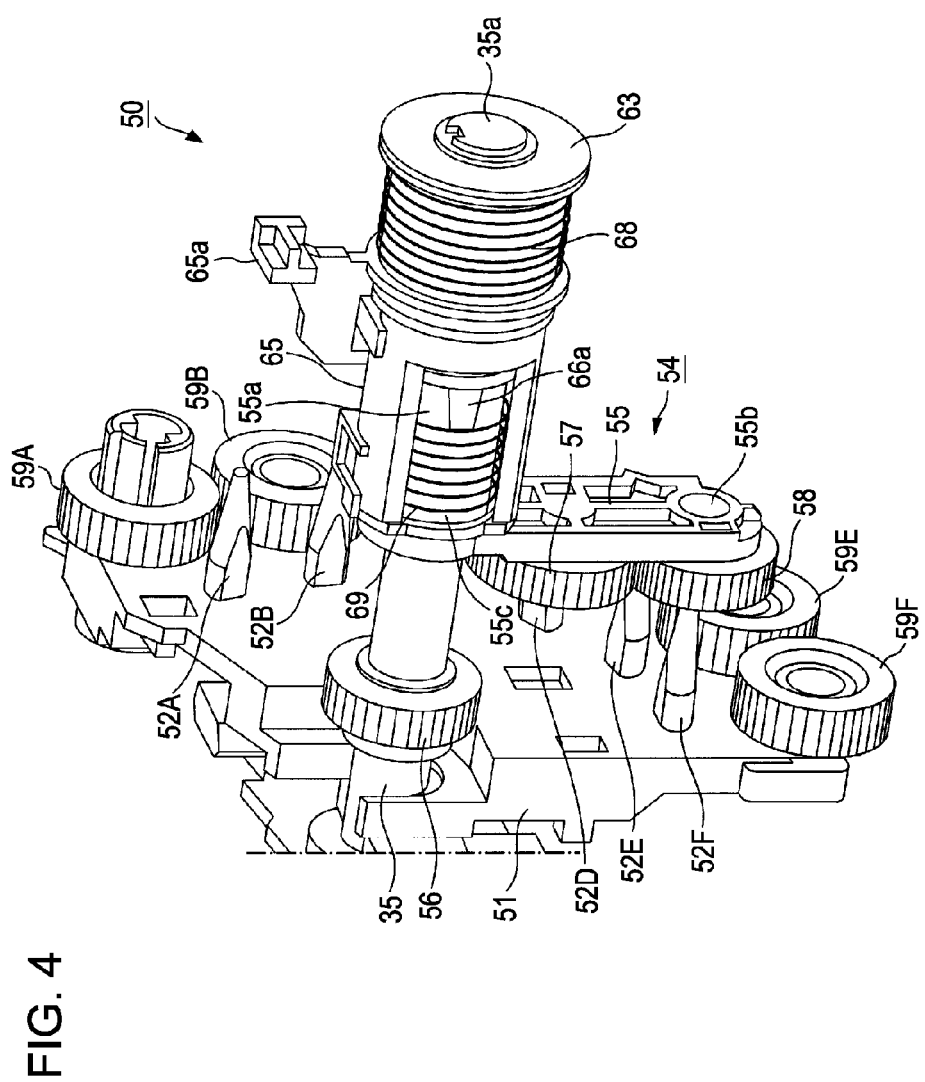
FIG. 4 is a perspective view of the entire power transmission switching device according to the embodiment of the invention.
Figure 5:
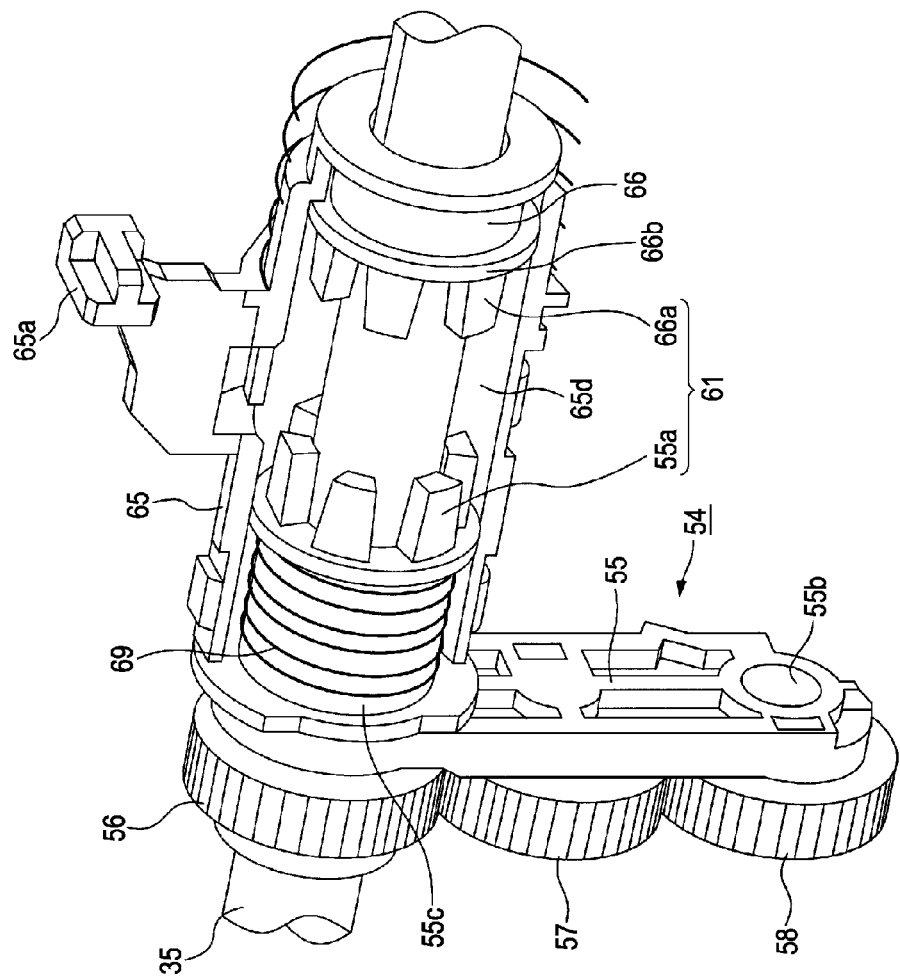
FIG. 5 is a perspective view of main parts of the power transmission switching device according to the embodiment of the invention.
Figure 6:
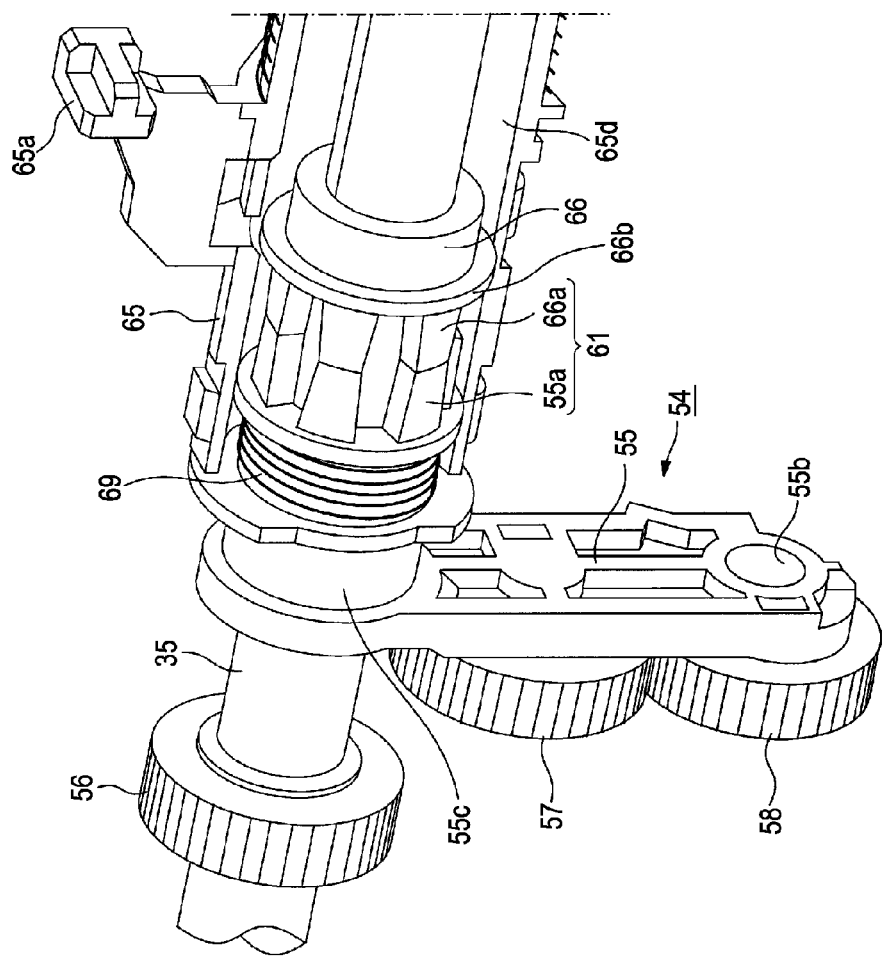
FIG. 6 is a perspective view of main parts of the power transmission switching device according to the embodiment of the invention.
Figure 7:
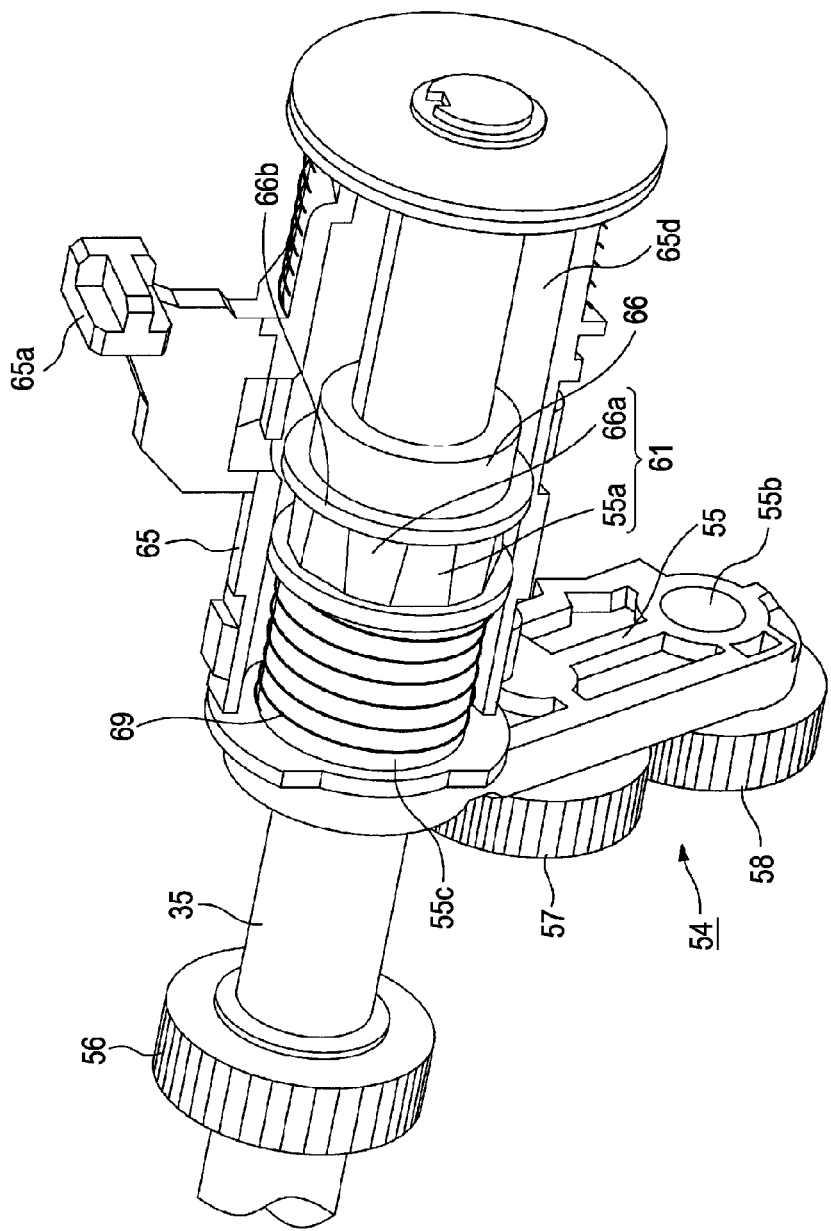
FIG. 7 is a perspective view of main parts of the power transmission switching device according to the embodiment of the invention.
Figure 8A:
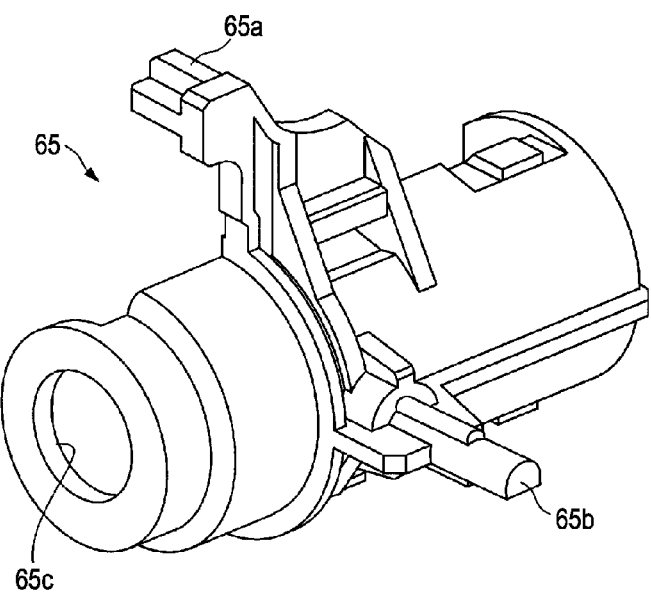
FIG. 8A is a perspective view of a case member.
Figure 8B:
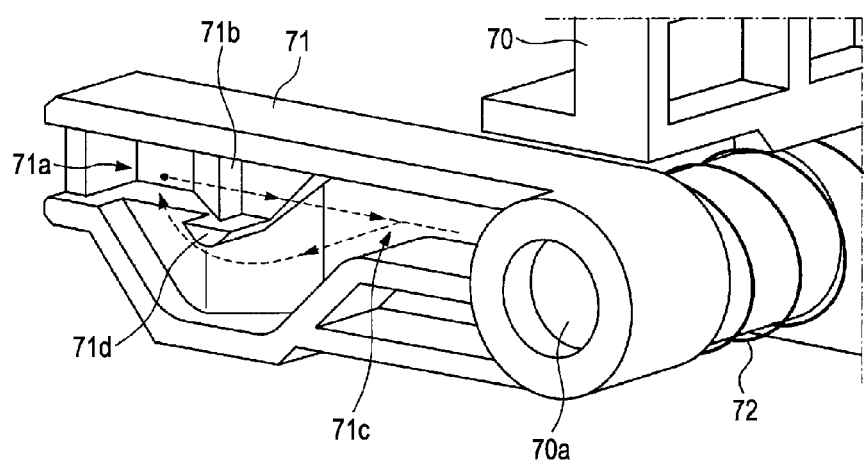
FIG. 8B is a perspective view of a cam member.

An embodiment of the invention will be described below with reference to FIGS. 1 to 14. FIG. 1 is a side cross-sectional view showing a paper sheet transport path of an ink jet printer (hereinafter, referred to as a "printer") 1 that is a recording apparatus according to an embodiment of the invention. FIG. 2 shows a front view of a power transmission switching device 50 according to an embodiment of the invention and a block diagram of a control system. FIGS. 3 and 4 are perspective views of the entire power transmission switching device 50 according to the embodiment of the invention. FIGS. 5 to 7 are perspective views of main parts of the power transmission switching device 50 according to the embodiment of the invention. FIG. 8A is a perspective view of a case member 65, and FIG. 8B is a perspective view of a cam member 71.

Further, FIGS. 9 to 13 are cross-sectional views of the power transmission switching device 50 according to the embodiment of the invention taken along a plane including the cam member 71, and show the changes in operation. FIG. 14 is a cross-sectional view of the power transmission switching device 50 according to the embodiment of the invention taken along a plane including a carriage engaging part 65a.

1. Structure of Recording Apparatus

The entire structure of the printer 1 will be outlined below with reference to FIGS. 1 and 2. The printer 1 includes a feeding device 2 at the bottom thereof. The printer feeds paper sheets (generally cut sheets: hereinafter, referred to as "paper sheets P"), which are examples of "media to be recorded", from the feeding device 2 one by one, performs recording (ink jet recording) by a recording device 4, and discharges the paper sheets toward a paper discharge stacker (not shown) that is provided at the front portion of the printer (on the left side in FIG. 1).

Components provided on a paper sheet transport path will be further described in detail below. The feeding device 2 includes a paper sheet cassette 11, a pickup roller 16, a guide roller 20, and a separation unit 21.

The paper sheet cassette 11, which can receive a plurality of paper sheets P while the paper sheets are stacked, can be mounted on or separated from a main body of the feeding device 2 at the front portion of the printer. The pickup roller 16, which is rotationally driven by a PF (paper feed) motor 9 (FIG. 2), is mounted on a swing member 17 that is swung about a pivot 18. The pickup roller comes in contact with the paper sheet received in the paper sheet cassette 11 and is rotated so as to feed the uppermost paper sheet P from the paper sheet cassette 11.

A separation member 12 is provided at a position that faces the ends of the paper sheets received in the paper sheet cassette 11, and the uppermost paper sheet P is moved toward the downstream side while the front end of the uppermost paper sheet P to be fed comes in sliding contact with the separation member 12. Accordingly, a first separation between the uppermost paper sheet and the next paper sheet P is performed. A guide roller 20, which can be freely rotated, is provided on the downstream side of the separation member 12. The separation unit 21, which includes a separation roller 22 and a driving roller 23 and performs a second separation of the paper sheet P, is provided on the downstream side of the guide roller.

A first paper feed unit 25 is provided on the downstream side of the separation unit 21. The first paper feed unit includes a driving roller 26 that is rotationally driven by the PF motor 9 (FIG. 2), and an assist roller 27 that is rotated while the paper sheet P is nipped between itself and the driving roller 26. The paper sheet P is further fed toward the downstream side by the first paper feed unit 25. Meanwhile, reference numeral 29 denotes a driven roller that reduces a paper-passing load generated when the paper sheet P passes through a curving reversing path (particularly, when the rear end of the paper sheet passes through the curving reversing path).

A second paper feed unit 31 is provided on the downstream side of the driven roller 29. The second paper feed unit includes a driving roller 32 that is rotationally driven by the PF motor 9 (FIG. 2), and an assist roller 33 that is rotated while the paper sheet P is nipped between itself and the driving roller 32. The paper sheet P is further fed toward the downstream side by the second paper feed unit 31.

The recording device 4 is disposed on the downstream side of the second paper feed unit 31. The recording device 4 includes a transport unit 5, a recording head 42, a front paper guide part 39, and a discharge unit 6. The transport unit 5 includes a transport driving roller 35 that is rotationally driven by the PF motor 9 (FIG. 2), and a transport driven roller 36 that is journaled to an upper paper guide part 37 so as to be pressed against the transport driving roller 35 and be rotated. Accordingly, the paper sheet P is fed toward a position, which faces the recording head 42, with high accuracy by the transport unit 5.

The recording head 42 is provided at the bottom of a carriage 40. The carriage 40 is driven by a CR (carriage) motor 8 (FIG. 2) so as to reciprocate in a main scanning direction while being guided by a guide shaft 41 extending in the main scanning direction (in a direction perpendicular to the plane of FIG. 1). Meanwhile, the carriage 40 is a so-called off-carriage type where an ink carriage is not mounted. An ink carriage (not shown) is provided independently of the carriage 40, and ink is supplied to the recording head 42 from the ink carriage through an ink supply tube (not shown).

A front paper guide part 39 is provided in the position that faces the recording head 42, and a distance between the paper sheet P and the recording head 42 is defined by the front paper guide part 39. Further, a discharge unit 6 is provided on the downstream side of the front paper guide part 39. The discharge unit includes a discharge driving roller 44 that is rotationally driven by the PF motor 9 (FIG. 2), and a discharge driven roller 45 that is rotated while coming in contact with the discharge driving roller 44. The paper sheet P on which recording has been performed by the recording device 4 is discharged to a stacker (not shown), which is provided at the front portion of the printer, by the discharge unit 6. The entire structure of the printer 1 has been described above.

2. Structure and Operation of Power Transmission Switching Device

Subsequently, the structure of the power transmission switching device 50 will be described. First, the structure of the power transmission switching device 50 will be outlined below with reference to FIG. 2. As shown in FIG. 2, the printer 1 includes two motors as a power source. One of the motors is the PF (paper feed) motor 9, and the other thereof is the CR (carriage) motor 8. The two motors are controlled by a controller 7.

The PF motor 9 is a common driving source of rollers, such as the driving roller 35 (transport unit 5) the driving roller 44 (discharge unit 6), and the driving roller 32 (second paper feed unit 31). The PF motor drives various driven parts of the printer 1 requiring power, such as the feeding device 2 and a pump device (not shown), by the power transmission switching device 50. Meanwhile, mechanisms A to F shown in FIG. 2 indicate the plurality of driven parts, and the mechanisms A to F are appropriately and generally referred to as "driven parts" in the following description.

However, the rollers provided on the paper sheet transport path, such as the driving roller 35 (transport unit 5), the driving roller 44 (discharge unit 6), and the driving roller 32 (second paper feed unit 31), make a one-to-one connection with the PF motor 9 not through the power transmission switching device. When the PF motor 9 is rotated, the rollers are always rotated in accordance with the rotation of the PF motor.

The power transmission switching device 50 uses the driving roller 35 as a power shaft, receives rotational torque from the driving roller 35, and transmits the rotational torque to the driven parts. Meanwhile, reference numerals 59A to 59F denote input gears of the driven parts. For example, when rotational torque is transmitted to the input gear 59A, the mechanism A is operated.

The power transmission switching device 50 includes a power transmission unit 54. The power transmission unit is provided so as to be displaced (is provided so that positions can be switched) between first and second positions that are positioned in an axial direction of the driving roller 35, and transmits the rotational torque of the driving roller 35 to the driven parts from the driving roller 35 in the first position.

The power transmission unit 54 is provided with an arm member 55 including a sleeve 55c (see FIGS. 5 to 7 and FIGS. 9 to 13). The sleeve forms a shaft hole into which the driving roller 35 is inserted. The arm member 55 is provided to be slidably displaced in the axial direction of the driving roller 35 through the sleeve 55c and to be swung about the driving roller 35 as shown by reference character "a".

A first planetary gear 57 and a second planetary gear 58 as a "transmission gear" are rotatably provided to the arm member 55. In this case, the swing of the arm member 55 is restrained by a restraining unit (to be described below) in the first position, but the arm member can be swung about the driving roller 35 in the second position. If the arm member is swung, the second planetary gear 58 is positioned at a position where the second planetary gear can be engaged (connected) with any one of the plurality of input gears 59A to 59F.

Figure 13:
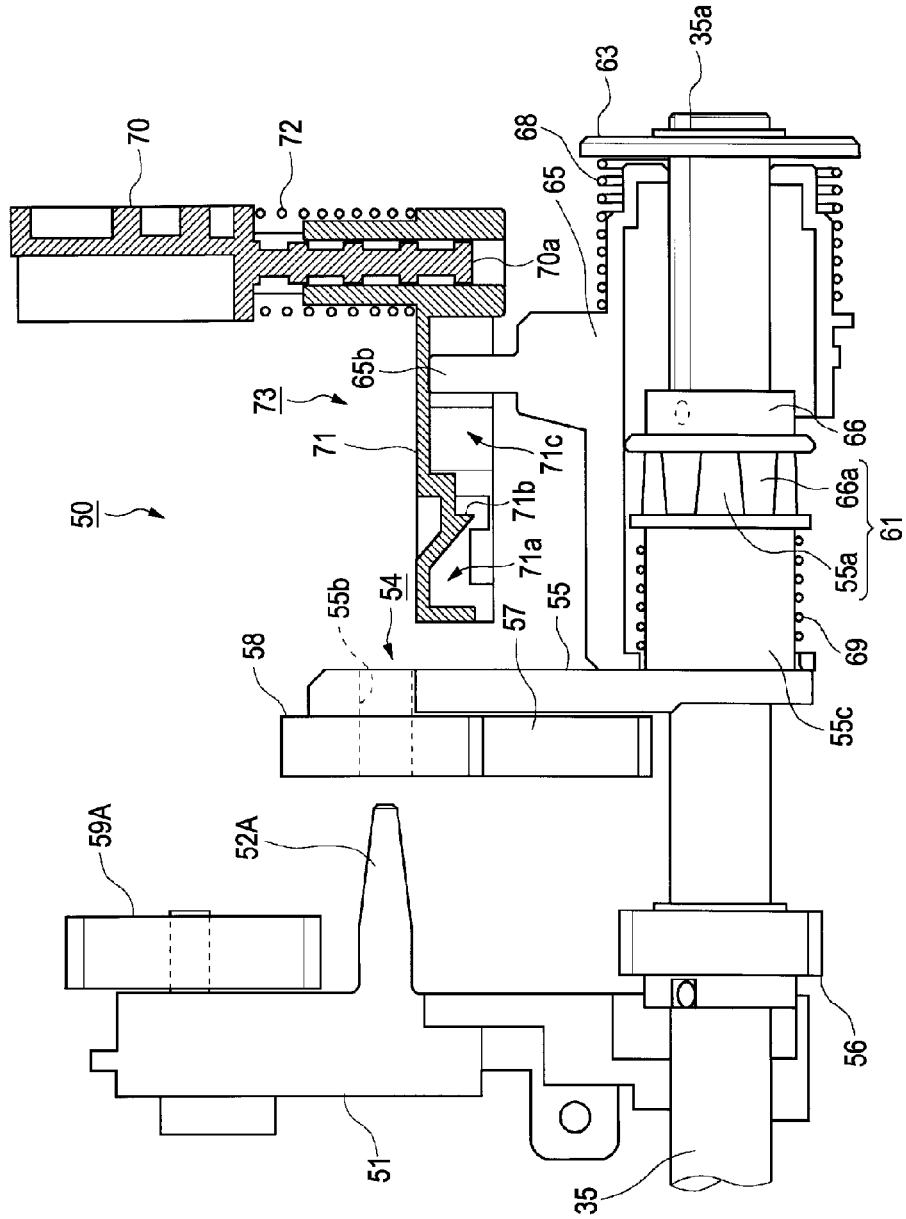
FIG. 13 is a cross-sectional view of the power transmission switching device according to the embodiment of the invention.
Figure 14:
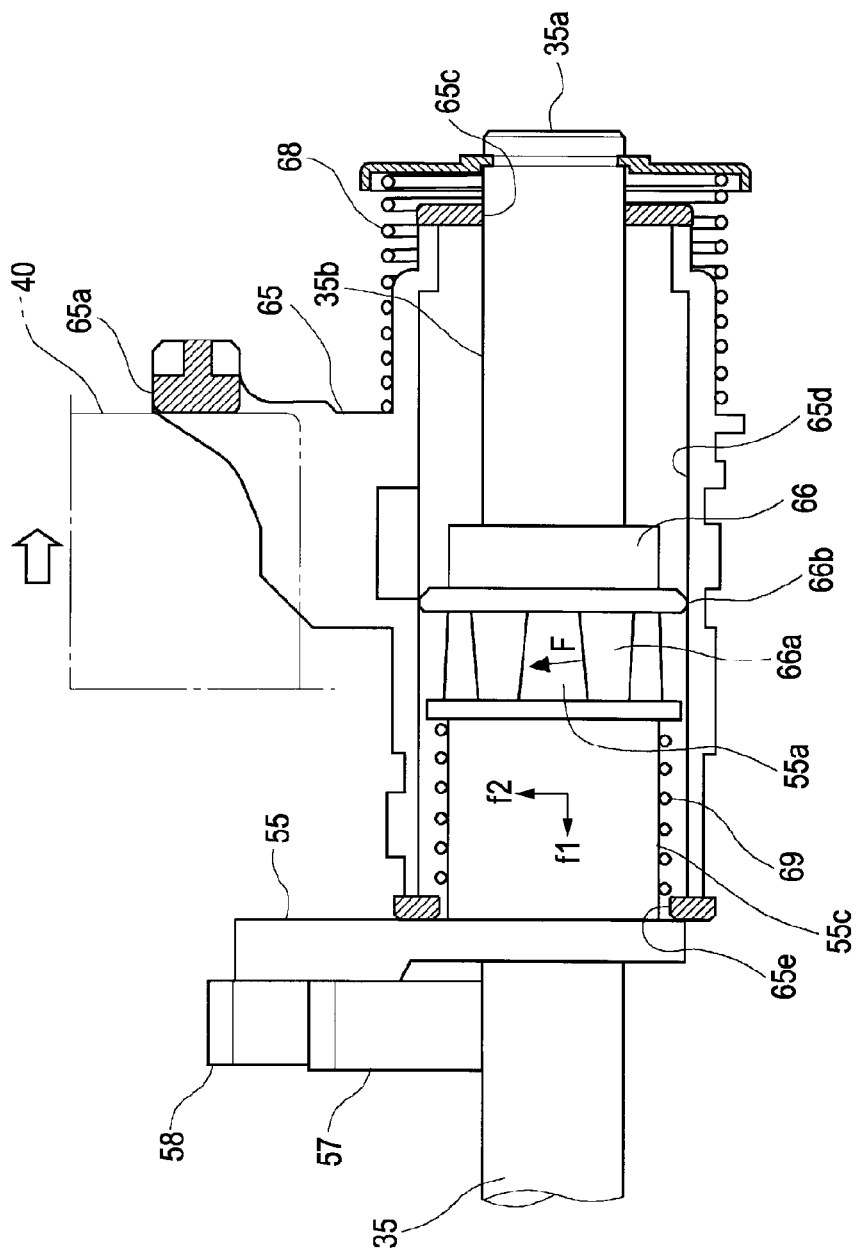
FIG. 14 is a cross-sectional view of the power transmission switching device according to the embodiment of the invention.

However, if the power transmission unit is in the second position, the second planetary gear 58 is positioned at a completely different position where the second planetary gear is not actually engaged with each of the input gears 59A to 59F (see FIGS. 4 and 13). If the position of the power transmission unit is switched from the second position to the first position, the second planetary gear 58 is engaged with any one of the input gears 59A to 59F.

Figure 9:
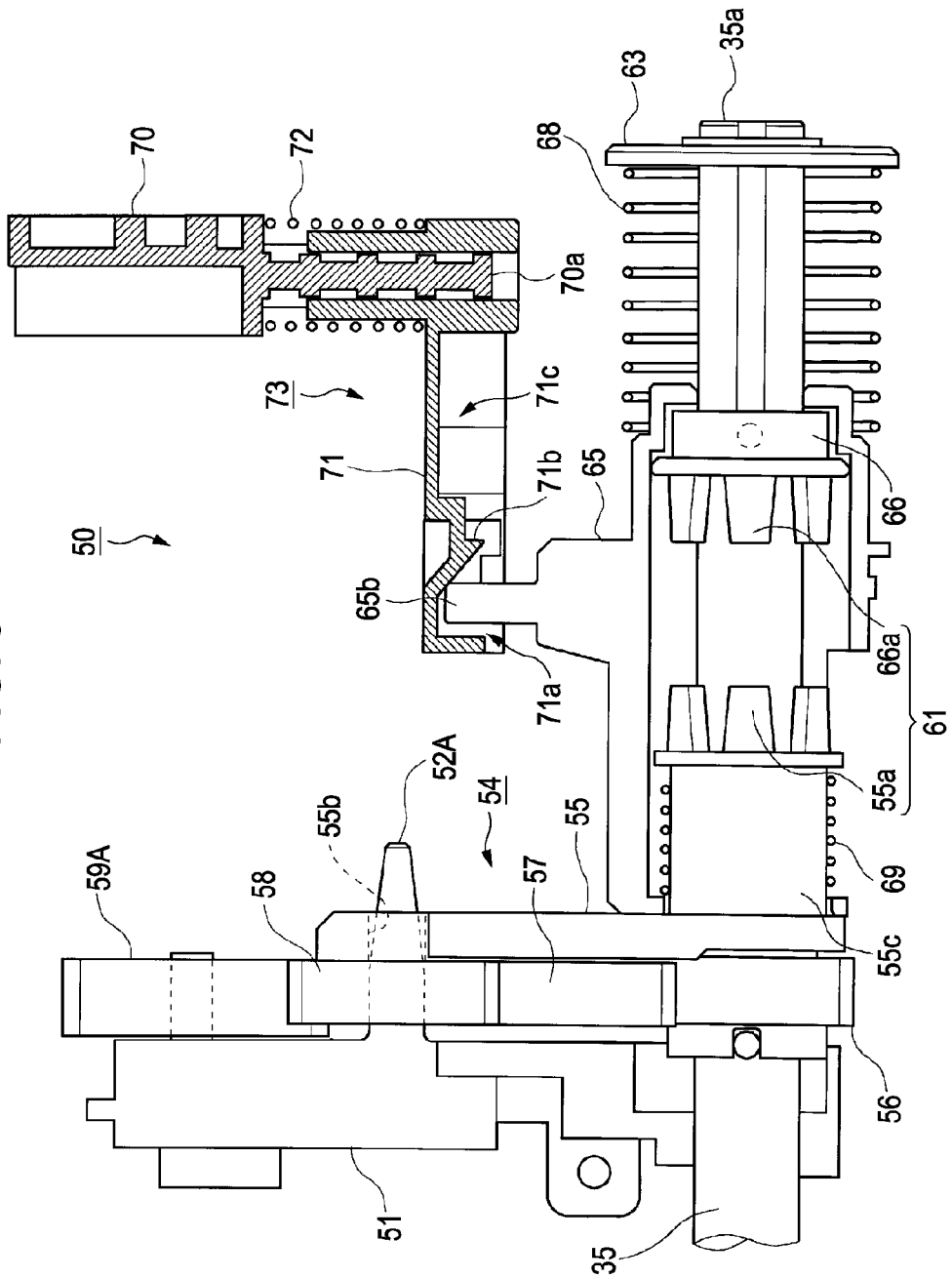
FIG. 9 is a cross-sectional view of the power transmission switching device according to the embodiment of the invention.

FIGS. 5 and 9 show that the power transmission unit 54 is in the first position. The driving roller 35 is provided with a driving gear 56 that is rotated together with the driving roller 35 as a single body. Accordingly, when the power transmission unit is in the first position as shown in FIG. 5, the first planetary gear 57 is engaged with the driving gear 56. Therefore, when the power transmission unit is in the first position, rotational torque is transmitted to the driving gear 56, the first planetary gear 57, the second planetary gear 58, and any one of the input gears 59A to 59F, in this order. That is, any one of the driven parts is driven.

Meanwhile, the power transmission unit is held in the first position by a coil spring 68 that is a first positioning member (pushing member) pushing the arm member 55 toward the frame 51. In more detail, a stopper 63 is provided at an axial end 35a of the driving roller 35, and the arm member 55 is pushed toward the frame 51, that is, to the left side in FIG. 9 by a pushing force of the coil spring 68 that is provided between the stopper 63 and a case member 65 (to be described below). Accordingly, the arm member 55 is bumped against the frame 51 by the pushing force, and the power transmission unit is held in the first position.

Further, when the arm member is in the first position, the swing of the arm member 55 is restrained by the restraining unit. In more detail, a hole 55b is formed at the arm member 55, and positioning pins 52A to 52F (also see FIGS. 3 and 4) protrude from the frame 51 toward the arm member 55.

The positioning pins 52A to 52F correspond to the input gears 59A to 59F, respectively, and are positioned near the input gears, respectively. For example, when the second planetary gear 58 provided to the arm member 55 is engaged with the input gear 52A, the positioning pin 52A is inserted into the hole 55b of the arm member 55. Accordingly, the swing of the arm member 55 is restrained, so that the engagement between the second planetary gear 58 and the input gear 59A is maintained.

As described above, the hole 55b of the arm member 55 and the positioning pins 52A to 52F form the restraining unit that restrains the swing of the arm member 55. Meanwhile, each of the positioning pins 52A to 52F is formed in a shape that is tapered toward the end. Accordingly, even though being not aligned with the center of the hole 55b to some extent, the front end of each of the positioning pin is correctly inserted into the hole 55b.

Subsequently, a position switching member that switches the position of the power transmission unit 54 formed as described above, and a clutch unit 61 that swings the arm member 55 will be described. As shown in FIG. 5, arm side comb-toothed parts 55a are formed at the end of the sleeve 55c of the arm member 55 so that a plurality of protrusions (teeth) protruding in the axial direction of the driving roller 35 is disposed in a circumferential direction of the driving roller 35 at predetermined intervals.

Further, an arm driving member (cylindrical member) 66 is provided at a position that faces the arm side comb-toothed parts 55a, so as to be rotated together with the driving roller 35 as a single body. Like the arm side comb-toothed parts 55a, power shaft side comb-toothed parts 66a are formed on the arm driving member 66 at a position facing the arm side comb-toothed parts 55a so that a plurality of protrusions (teeth) protruding in the axial direction of the driving roller 35 is disposed in the circumferential direction of the driving roller 35 at predetermined intervals.

When the power transmission unit 54 is in the second position, the arm side comb-toothed parts 55a and the power shaft side comb-toothed parts 66a are engaged with each other as shown in FIG. 7. When the power transmission unit 54 is in the second position, the rotational torque of the driving roller 35 is transmitted to the arm member 55 by the engagement between the arm side comb-toothed parts and the power shaft side comb-toothed parts. Accordingly, the driving roller 35 and the arm member 55 are rotated (swung).

More specifically, a case member 65, which forms a cylindrical shape so as to include the arm side comb-toothed parts 55a and the power shaft side comb-toothed parts 66a therein as shown in FIGS. 5 and 14, is provided. The case member is formed so that the sleeve 55c is inserted into the case member 65 from one opening of the case member and a predetermined gap is formed between the inner peripheral surface 65e of the one opening and the outer peripheral surface of the sleeve 55c. Further, the case member is formed so that the inner peripheral surface 65c (also see FIG. 8A) of the other opening of the case member comes in sliding contact with the outer peripheral surface of the driving roller 35.

A coil spring 69 serving as a pushing member is provided between the case member 65 and the arm member 55. If the case member 65 is displaced to the right side in FIG. 14 against the pushing force of the coil spring 68, the arm member 55 is also displaced to the right side (from the first position toward the second position) by a pushing force of the coil spring 69.

In this case, the case member 65 and the arm member 55 are engaged with each other with the coil spring 69 interposed therebetween. Accordingly, even though the arm side comb-toothed parts 55a and the power shaft side comb-toothed parts 66a are not correctly engaged with each other and the ends of the teeth of the both comb-toothed parts collide with each other, only the case member 65 can be displaced while the arm member 55 (arm side comb-toothed parts 55a) is stopped by the compression of the coil spring 69 as shown in FIG. 6.

Therefore, even though the arm side comb-toothed parts 55a and the power shaft side comb-toothed parts 66a are not correctly engaged with each other and the ends of the teeth of the both comb-toothed parts collide with each other, breakage does not occur. If the driving roller 35 is rotated by a predetermined angle while the ends of the both comb-toothed parts collide with each other, the arm side comb-toothed parts 55a and the power shaft side comb-toothed parts 66a are correctly engaged with each other as shown in FIG. 7.

Further, when the power transmission unit 54 is in the second position, the arm side comb-toothed parts 55a and the power shaft side comb-toothed parts 66a are engaged with each other as shown in FIGS. 7, 13, and 14. If the driving roller 35 is rotated in this state, the arm member 55 is swung in accordance with the rotation of the driving roller and the second planetary gear 58 is positioned at a position where the second planetary gear is engaged with any one of the input gears 59A to 59F.

Meanwhile, the positioning is performed using a positioning frame 60 (FIG. 2). That is, when the arm member 55 is swung in a counterclockwise direction of FIG. 2 and is bumped against the positioning frame 60 (that is, when a drive current value of the PF motor 9 exceeds a threshold value), the driving roller 35 is rotated by a predetermined angle, so that the second planetary gear 58 is positioned at a target position. Meanwhile, the rotation angle of the driving roller 35 may be detected by a rotation detector (not shown).

The arm side comb-toothed parts 55a and the power shaft side comb-toothed parts 66a form a clutch unit 61 that swings the arm member 55. When the power transmission unit 54 is in the first position, the clutch unit is disengaged from the arm member 55 as described above. When the power transmission unit 54 is in the second position, the clutch unit is engaged with the arm member 55 and transmits the rotational torque of the driving roller 35 to the arm member 55.

Subsequently, the switching of the position of the power transmission unit 54 is performed by the coil spring 68 that pushes the power transmission unit 54 toward the first position, and the carriage 40 that is a second positioning member (position switching member) displacing the power transmission unit from the first position toward the second position against the pushing force of the coil spring 68.

When the carriage 40 is in a recording area, that is, when the power transmission unit 54 is not engaged with the carriage 40, the power transmission unit 54 is maintained in the first position by the pushing force of the coil spring 68 as described above. If the carriage 40 is moved toward a home position (toward the axial end 35a of the driving roller 35) in this state, the carriage engaging part 65a serving as an engaged part formed at the case member 65 is engaged with the side surface of the carriage 40.

Further, if the carriage 40 is further moved, the case member 65 is pushed and the power transmission unit 54 is displaced from the first position to the second position. As long as the carriage 40 is maintained in the position, the power transmission unit 54 is held in the second position. Meanwhile, since the arm side comb-toothed parts 55a are pressed against the power shaft side comb-toothed parts 66a by the pushing force of the coil spring 69 in this state, the engagement between the both comb-toothed parts is maintained. Accordingly, the carriage 40 forms the second positioning member that displaces the power transmission unit 54 from the first position to the second position and holds the power transmission unit in the second position.

Subsequently, a middle position of the power transmission unit 54 will be described. As described above, the power transmission unit 54 is displaced between the first position and the second position, rotational torque is transmitted to the driven part from the driving roller 35 in the first position, and the second planetary gear 58 is positioned by the swing of the arm member 55 in the second position. A middle position is set between the first position and the second position, and the power transmission unit 54 can be held in the middle position against the pushing force of the coil spring 68 by a holding unit 73 (to be described below) independently of the carriage 40.

The middle position and the holding unit 73 that holds the power transmission unit in the middle position will be described in detail below.

As shown in FIGS. 8A and 9, a restrained portion 65b is formed on the case member 65 so as to have the shape of a protrusion that protrudes in a lateral direction (a direction orthogonal to a displacement direction of the case member 65). A cam member 71 is provided to a holder 70, which is provided on the side of the case member 65, as shown in FIGS. 3 and 9.

The cam member 71 is provided to the holder 70 so as to be swingable about a shaft 70a that extends in a direction orthogonal to the displacement direction of the case member 65, and is pushed toward the case member 65 by the coil spring 72.

The cam member 71 includes recesses in which the end of the restrained portion 65b is received as shown in FIG. 8B, and a guide passage that guides the end of the restrained portion 65b in a direction indicated by an arrow of FIG. 8B in accordance with the displacement of the case member 65. Further, a stopper 71b, which regulates the displacement of the restrained portion 65b (case member 65) toward the first position, is formed on the guide passage. The stopper is formed so that the end of the restrained portion 65b cannot be moved in a direction opposite to the guide direction indicated by the arrow (cannot return to the first recess 71a) if being moved from a first recess 71a toward the stopper 71b and getting over the stopper 71b.

The stopper 71b is disposed at a position where the return of the case member 65 toward the first position is regulated when the case member 65 (that is, the power transmission unit 54) is in the middle position between the first and second positions. Accordingly, the power transmission unit 54 can be held in the middle position against the pushing force of the coil spring 68, independently of the carriage 40. As described above, the restrained portion 65b and the cam member 71, which are formed at the case member 65, form the holding unit 73 that holds the power transmission unit 54 in the middle position.

The middle position will be further described below with reference to FIGS. 9 to 13. FIG. 9 shows that the power transmission unit 54 is in the first position. In this state, rotational torque is transmitted to the driven part from the driving gear 56 of the driving roller 35 through the first and second planetary gears 57 and 58 as described above. Meanwhile, for convenience of description, FIGS. 9 to 13 show that rotational torque is transmitted to the input gear 59A. Accordingly, the input gears 59B to 59F and the positioning pins 52B to 52F, which should be shown in drawings in principle, are omitted for simplification of the drawings.

Figure 10:
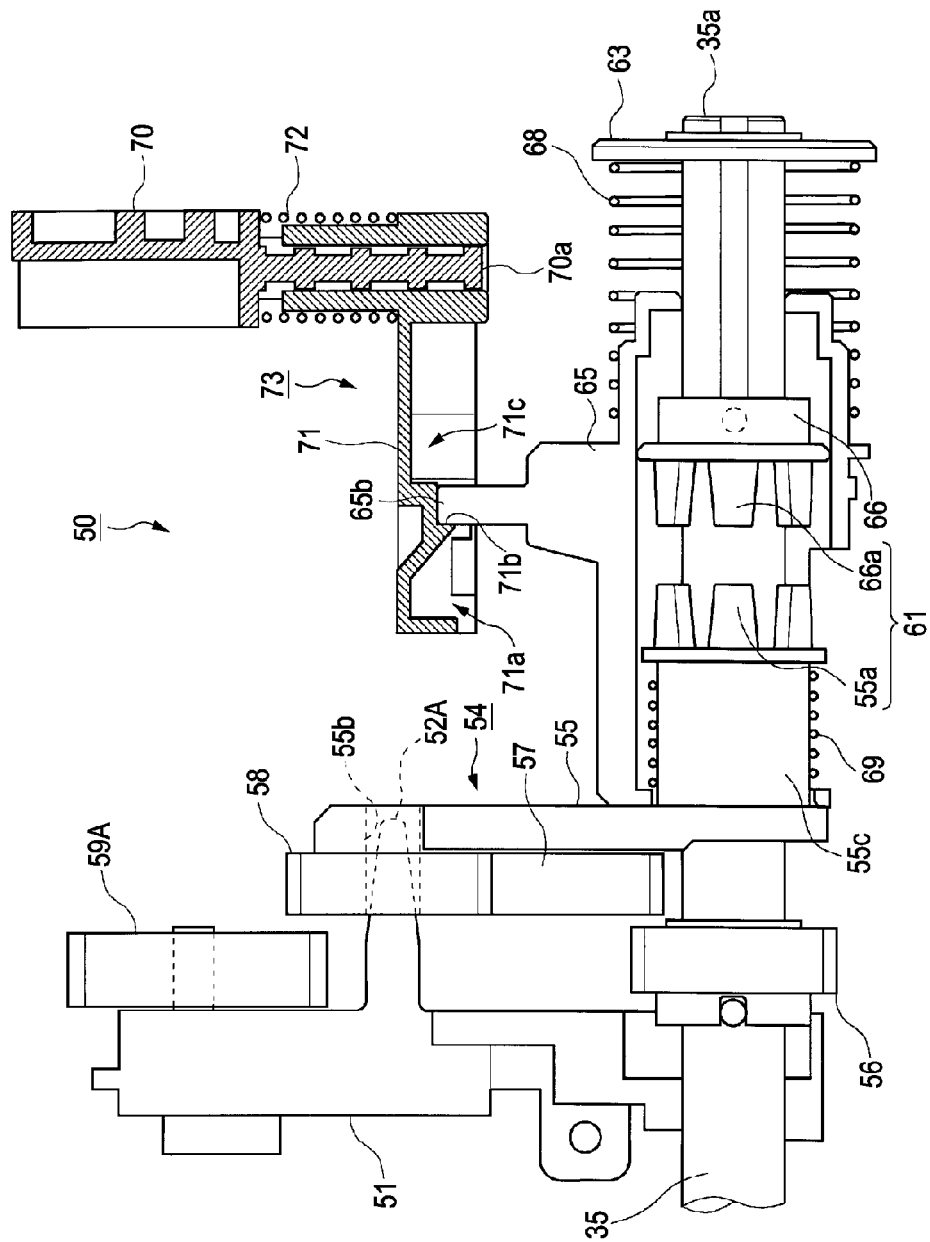
FIG. 10 is a cross-sectional view of the power transmission switching device according to the embodiment of the invention.

In this state, the restrained portion 65b is positioned in the first recess 71a of the cam member 71. If the carriage 40 pushes the carriage engaging part 65a of the case member 65 in this state and the power transmission unit 54 is thus displaced to the right side in FIG. 9, the restrained portion 65b gets over the stopper 71b of the cam member 71 and is in a state where the return of the case member toward the first position is regulated, that is, in a state where the power transmission unit 54 is held in the middle position as shown in FIG. 10.

When the power transmission unit is in the middle position, the driving gear 56 is disengaged from the first planetary gear 57 and the second planetary gear 58 is also disengaged from the input gear 59A. However, the arm side comb-toothed parts 55a and the power shaft side comb-toothed parts 66a are not engaged with each other. Accordingly, when the power transmission unit is in the middle position, rotational torque is not transmitted to the driven part in accordance with the rotation of the driving roller 35 and is also not transmitted to the arm member 55. That is, the middle position of the power transmission unit 54 becomes a non-connection position where the power transmission unit is not connected to the driving roller 35.

Meanwhile, when the power transmission unit is in the middle position, the positioning pin 52A is aligned with the hole 55b of the arm member 55 and the positioning of the second planetary gear 58 is maintained (the selection of the input gear 59A is maintained). Further, when the power transmission unit returns to the first position before the position of the power transmission unit is switched from the middle position to the second position, the insertion of the positioning pin 52A into the hole 55b of the arm member 55 is maintained, that is, the swing of the arm member 55 is restrained.

Figure 11:
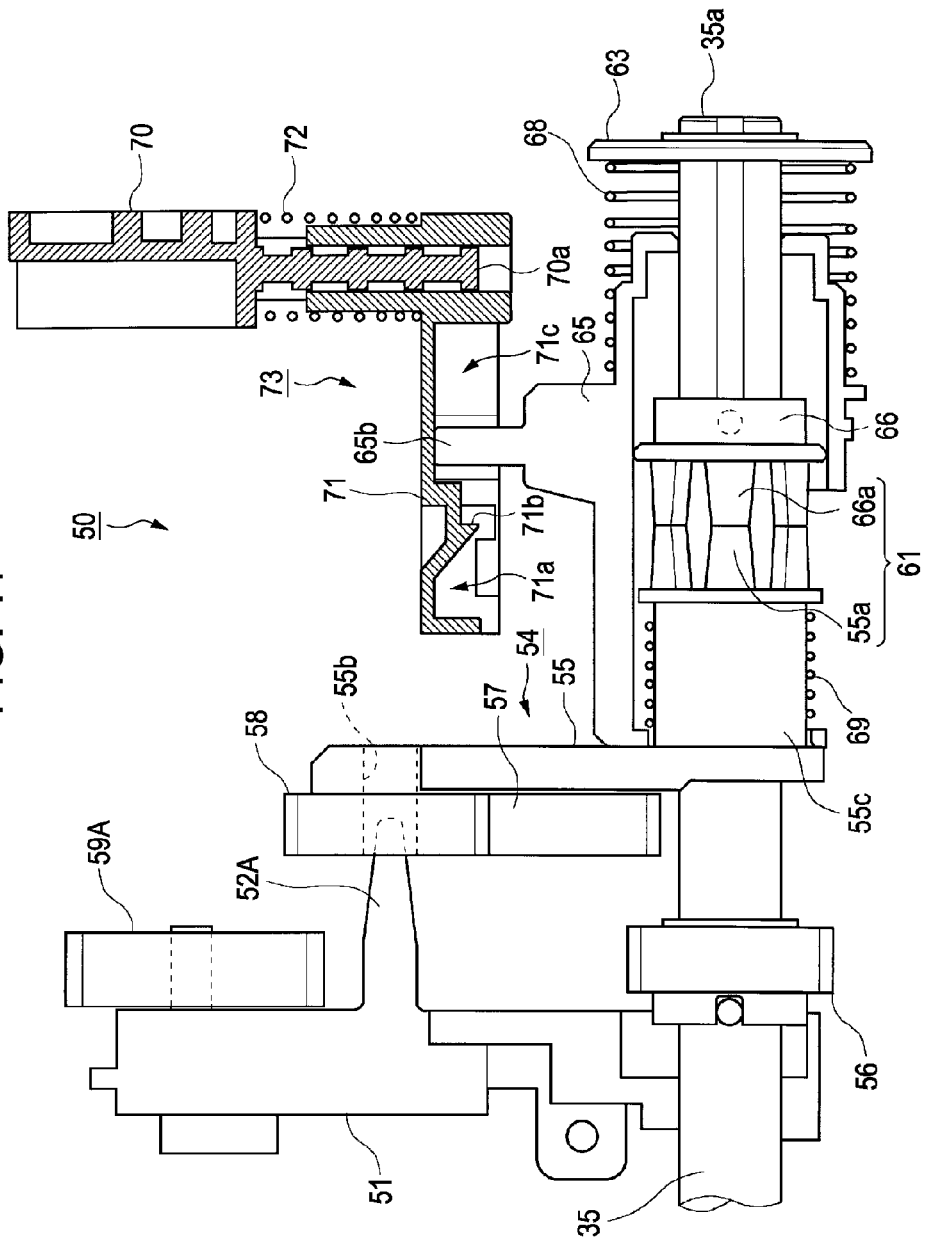
FIG. 11 is a cross-sectional view of the power transmission switching device according to the embodiment of the invention.

Subsequently, if the carriage 40 is further moved toward the home position, the end of the restrained portion 65b is moved to a second recess 71c of the cam member 71 as shown in FIG. 11. Meanwhile, the second recess 71c is formed to have a depth larger than the depth of the stopper 71b. Accordingly, if being moved to the second recess 71c, the end of the restrained portion 65b is not moved in a direction opposite to the guide direction (arrow) shown in FIG. 8B and does not return to the position where the end of the restrained portion is engaged with the stopper 71b.

However, if the carriage 40 is separated toward the recording area in this state, the end of the restrained portion 65b can be moved along a locus indicated by an arrow of FIG. 8B (passing below a protrusion 71d) and return to the first recess 71a. Before the position of the power transmission unit is switched from the first position to the middle position and then switched to the second position, the power transmission unit 54 can return to the first position in this way.

Referring to FIG. 11, when the end of the restrained portion 65b is moved to the second recess 71c of the cam member 71, the arm side comb-toothed parts 55a and the power shaft side comb-toothed parts 66a are not correctly engaged with each other and the ends of the teeth of the both comb-toothed parts may collide with each other. However, only the case member 65 can be moved to the right side in FIG. 11 as described above and the driving roller 35 is then rotated by a predetermined angle, so that the arm side comb-toothed parts 55a and the power shaft side comb-toothed parts 66a can be correctly engaged with each other as shown in FIGS. 12 and 13.

Figure 12:
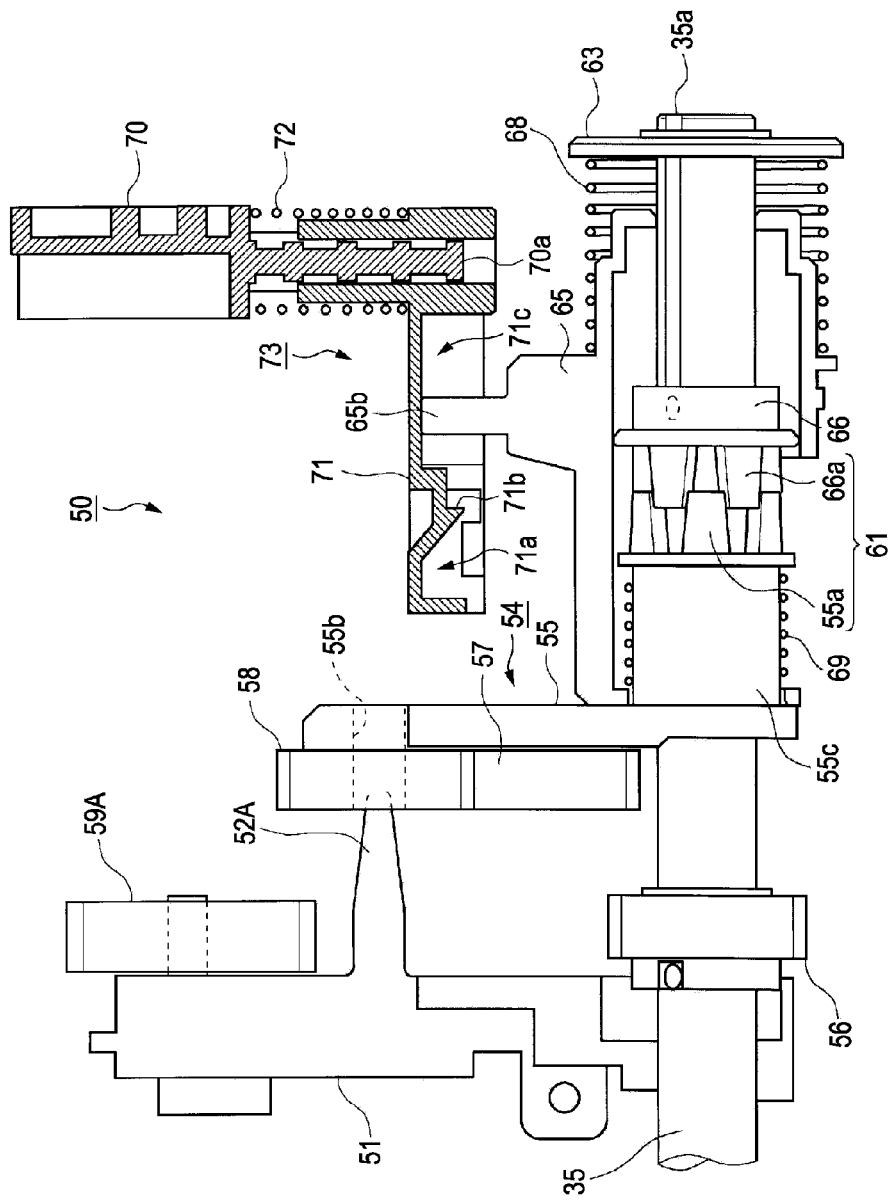
FIG. 12 is a cross-sectional view of the power transmission switching device according to the embodiment of the invention.

Meanwhile, when the positioning pin 52A begins to be not aligned with the hole 55b of the arm member 55 as shown in FIG. 12, the arm side comb-toothed parts 55a and the power shaft side comb-toothed parts 66a already begin to be engaged with each other. That is, the arm member 55 is not free in the entire displacement area between the first and second positions, and is necessarily in any one state of a state where the swing of the arm member is restrained by the positioning pin 52A and a state where the arm side comb-toothed parts 55a and the power shaft side comb-toothed parts 66a are engaged with each other and rotational torque may be transmitted from the driving roller 35.

Further, when the arm side comb-toothed parts 55a and the power shaft side comb-toothed parts 66a are engaged with each other (are pressed against each other), an elastic force of the coil spring 69 making the both comb-toothed parts be engaged with each other is set so that the both comb-toothed parts are pressed against each other and maintained. That is, in FIG. 14, each of the faces of the teeth of the arm side comb-toothed parts 55a and the power shaft side comb-toothed parts 66a, which come in contact with each other, forms a predetermined angle with respect to the axial direction of the driving roller 35. Accordingly, pressure F, which is generated on the faces of the teeth when the power shaft side comb-toothed parts 66a transmit rotational torque to the arm side comb-toothed parts 55a, may be decomposed into a component f1 that is parallel to the axial direction of the driving roller 35 and a component f2 that is orthogonal to the axial direction.

If the component f1 is large, the arm side comb-toothed parts 55a are moved toward the left side in FIG. 14, that is, in a direction where the arm side comb-toothed parts 55a are disengaged from the power shaft side comb-toothed parts 66a, against the elastic force of the coil spring 69. In this case, the faces of the teeth of the arm side comb-toothed parts 55a and the power shaft side comb-toothed parts 66a, which are engaged with each other, slide each other. For this reason, the arm member 55 is slightly swung. Accordingly, in order to prevent the arm member from being slightly swung, the elastic force of the coil spring 69 is set to be larger than the force f1 so that the arm side comb-toothed parts 55a and the power shaft side comb-toothed parts 66a are pressed against each other and maintained.

Further, when the carriage 40 pushes the carriage engaging part 65a to the right side in FIG. 14, clockwise moment in FIG. 14 is generated at the case member 65. However, the moment is taken by a contact portion between the driving roller 35 and the inner peripheral surface 65c of one opening of the case member 65, and a contact portion between the inner peripheral surface 65d of the case member 65 and a flange 66b of the arm driving member 66. That is, the sleeve 55c of the arm member 55 does not come in contact with the case member 65 due to the moment.

Subsequently, referring to FIG. 13, if the carriage 40 is moved toward the recording area from the second position of the power transmission unit 54 shown in FIG. 13 and is separated from the carriage engaging part 65a, the power transmission unit 54 returns to the first position by the pushing force of the coil spring 68. In this case, the restrained portion 65b passes below the protrusion 71d of the cam member 71, that is, is moved in the guide direction indicated by the arrow of FIG. 8B, and returns to the first recess 71a again.

The operation of the power transmission switching device 50 has been described above.

3. Advantages of Power Transmission Switching Device

The advantages of the power transmission switching device 50 will be described below.

(1) The power transmission unit 54 has the first position where the power transmission unit is held by the pushing force of the coil spring 68, the second position where the power transmission unit is held by the carriage 40, and the middle position where the power transmission unit is held by the holding unit 73 independently of the carriage 40. That is, since not only the first position but also the middle position is set as positions where the carriage 40 can be held without staying in the home position, it may be possible to secure the degree of freedom in the operation of the carriage 40.

(2) It may be possible to quickly switch the position of the power transmission unit 54 to the middle position without performing additional operations by only one action that displaces the power transmission unit 54 from the first position to the middle position by the carriage 40.

(3) Since the middle position of the power transmission unit 54 is a non-connection position where the power transmission unit 54 is not connected to the driving roller 35, it may be possible to secure free rotation of the driving roller 35 when the power transmission unit 54 is in the middle position.

(4) The carriage engaging part 65a to be engaged with the carriage 40 is formed at the case member 65 that is a member separate from the arm member 55. Accordingly, when the carriage engaging part 65a is pushed by the carriage 40, the arm member 55 is displaced by the elastic force of the coil spring 69 (elastic member) that is provided between the carriage engaging part 65a (case member 65) and the arm member 55.

For this reason, even though the arm side comb-toothed parts 55a are not engaged with the power shaft side comb-toothed parts 66a and the ends of the teeth of the both comb-toothed parts collide with each other, the arm member 55 can be stopped in that position and the breakage of the teeth may be prevented. In addition, since the arm side comb-toothed parts 55a are pushed so as to be engaged with the power shaft side comb-toothed parts by the elastic force of the coil spring 69, the both comb-toothed parts may be correctly engaged with each other if the driving roller 35 is rotated by a predetermined angle.

(5) When the arm side comb-toothed parts 55a and the power shaft side comb-toothed parts 66a are engaged with each other, the elastic force of the coil spring 69 making the both comb-toothed parts be engaged with each other is set so that the arm side comb-toothed parts 55a and the power shaft side comb-toothed parts 66a are pressed against each other and maintained without being separated from each other. Accordingly, the faces of the teeth of the arm side comb-toothed parts 55a and the power shaft side comb-toothed parts 66a, which are engaged with each other, is prevented from sliding each other, which prevents the arm member 55 from being slightly swung. Therefore, it may be possible to prevent the deterioration of the positioning accuracy of the second planetary gear 58 that is caused by the unintended swing of the arm member 55.

(6) The sleeve 55c of the arm member 55 does not come in contact with the case member 65 due to the moment, which is generated at the case member 65 when the carriage 40 pushes the carriage engaging part 65a. Accordingly, while the teeth of the arm side comb-toothed parts 55a and the power shaft side comb-toothed parts 66a are bumped against each other, if the arm member 55 is further moved in a direction that makes the arm side comb-toothed parts and the power shaft side comb-toothed parts be engaged with each other, the teeth of the arm side comb-toothed parts 55a and the power shaft side comb-toothed parts 66a come in strong contact with each other. As a result, it may be possible to prevent the breakage of the teeth.

(7) While the power transmission unit 54 returns to the first position before being displaced from the first position to the middle position and then displaced to the second position, the swing of the arm member 55 is restrained. Accordingly, the second planetary gear 58 is maintained while selecting any one of the input gears 59A to 59F. As a result, when the power transmission unit returns to the first position, the selected driven part may be promptly driven without selecting one of the input gears.

(8) The arm member 55 is not free in the entire displacement area between the first and second positions, and is necessarily in any one state of a state where the swing of the arm member is restrained by the positioning pins 52A to 52F and a state where the arm side comb-toothed parts 55a and the power shaft side comb-toothed parts 66a are engaged with each other and rotational torque may be transmitted from the driving roller 35. Accordingly, it may be possible to correctly control the attitude of the arm member 55 without the unintended swing of the arm member 55.

Meanwhile, the structure where the power transmission switching device according to the embodiment of the invention is applied to an ink jet printer that is an example of the recording apparatus, and the advantages thereof have been described above. However, the invention is not limited thereto, and may be applied to other various apparatuses.

What is claimed is:

1. A power transmission switching device comprising:
a power source;
a power shaft that is rotationally driven by the power source;
a plurality of specified mechanisms which are driven by the power source;
a power transmission unit, and
a clutch unit which switches a connection and a non-connection between the power shaft and the power transmission unit;
wherein, when the power transmission unit is in a selecting position, the power transmission unit and the power shaft are connected and the power transmission unit which is driven by the power shaft selects one of the plurality of specified mechanisms,
when the power transmission unit is in a transmitting position, the power transmission unit and the power shaft are not connected and
the power transmission unit transmits the power from the power source to the selected one of the plurality of specified mechanisms.

2. The power transmission switching device according to claim 1, wherein the power transmission unit is swingable about a swing shaft, and the specific mechanisms are located on a circumference around the swing shaft.

3. A power transmission switching device according to claim 2, wherein the clutch unit is provided on a swing shaft coaxial.

* * * * *